US007420794B2

(12) United States Patent
Olcen

(10) Patent No.: US 7,420,794 B2
(45) Date of Patent: Sep. 2, 2008

(54) COMPACT SPARK GAP FOR SURGE PROTECTION OF ELECTRICAL COMPONENTRY

(75) Inventor: Ahmet Burak Olcen, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 321 days.

(21) Appl. No.: 11/267,650

(22) Filed: Nov. 4, 2005

(65) Prior Publication Data

US 2006/0061931 A1 Mar. 23, 2006

Related U.S. Application Data

(63) Continuation-in-part of application No. 11/178,885, filed on Jul. 11, 2005, now abandoned, which is a continuation-in-part of application No. 10/339,730, filed on Jan. 9, 2003, now Pat. No. 6,930,872, which is a continuation-in-part of application No. 09/858,739, filed on May 16, 2001, now Pat. No. 6,510,034.

(51) Int. Cl.
*H01C 7/12* (2006.01)
*H02M 1/00* (2007.01)

(52) U.S. Cl. ...................................... 361/119; 361/111

(58) Field of Classification Search .................. 361/86, 361/91, 111, 112, 117–120, 126, 129, 130
See application file for complete search history.

(56) References Cited

U.S. PATENT DOCUMENTS 3,492,534 A 1/1970 Szeremy et al.
4,160,210 A 7/1979 Molinari
4,701,725 A 10/1987 Dorsey
4,862,311 A 8/1989 Rust et al.
5,077,630 A 12/1991 Bina
5,142,434 A 8/1992 Boy et al.
5,555,150 A 9/1996 Newman, Jr.
5,923,519 A 7/1999 Chang et al.
5,973,898 A 10/1999 Merchant et al.
6,351,011 B1 2/2002 Whitney et al.
6,380,826 B1 4/2002 Palinkas
6,678,138 B2 1/2004 Glaser et al.
6,721,155 B2 * 4/2004 Ryman ....................... 361/117
6,825,651 B2 11/2004 Belady et al.
7,102,868 B2 * 9/2006 Montena ..................... 361/119
7,123,463 B2 * 10/2006 Devine et al. ............... 361/119

* cited by examiner

*Primary Examiner*—Matthew V Nguyen
(74) *Attorney, Agent, or Firm*—Marjama Muldoon Blasiak & Sullivan LLP

(57) ABSTRACT

An over-voltage surge protection device includes a circuit board having a signal carrying conductive member with a plurality of nodes positioned therealong, and a conductive member running to ground positioned therealong. The nodes on the signal carrying member and the ground conductive member each extend along a common path with corresponding ones of the signal carrying nodes positioned in adjacent, but spaced relation to the ground member, wherein the conductive member running to ground is formed along the interior of the main body enclosing the circuit board and the signal carrying conductive member. The peripheral edges of the nodes accumulate and discharge transient high voltage surges. The nodes can be shaped in the form of triangles due to this particular geometry's favorable ability to accumulate and discharge voltage, but may also be formed in a variety of other geometries.

15 Claims, 12 Drawing Sheets

(3X)

(8X)

COMPACT SPARK GAP FOR SURGE PROTECTION OF ELECTRICAL COMPONENTRY

CROSS REFERENCE TO RELATED APPLICATIONS

This patent application is a continuation in part application of U.S. Ser. No. 11/178,885, filed Jul. 11, 2005, now abandoned; which is a continuation in part application of Ser. No. 10/339,730, filed Jan. 9, 2003, now allowed (U.S. Pat. No. 6,930,872); which is a continuation-in-part of U.S. Ser. No. 09/858,739, filed May 16, 2001, now U.S. Pat. No. 6,510,034, issued Jan. 21, 2003, the entire contents of each being incorporated by reference in their entirety.

FIELD OF THE INVENTION

This invention relates to electrical surge protection devices, and more particularly to surge protection devices having spark gaps.

BACKGROUND OF THE INVENTION

Broadband coaxial cable communications networks, such as CATV networks, include various types of electronic equipment mounted to outdoor utility poles. This electronic equipment is subjected to all types of weather conditions including, for example, lightning storms. Due to the importance of these communications networks to society, it is important that they be able to withstand the harsh conditions under which they operate.

On occasion, a high voltage surge may be transmitted through the coaxial cable to which the electronic components are interconnected, for instance, due to a lightning strike. If this high voltage surge is permitted to be picked up by the input or output pins of the interconnect device and transmitted to the electrical devices housed therein, the device would become inoperable due to the electrical components essentially melting or otherwise deteriorating as a consequence of the surge. A new electronic device would then need to be installed at the site of the surge.

In order to improve the reliability of the electronic components in a communications network, the interconnect units are generally equipped with some type of over-voltage surge protection device. IEEE Standard C62.41-1991 sets forth a recommended practice on surge voltages in low voltage power circuits. The surge protectors incorporated into the interconnect units may include, for instance, a single, conductive element positioned in adjacent, but spaced relation to the incoming signal. In the event of a transient, high voltage surge, the element will accumulate and discharge the over-voltage surge to ground prior to it passing through the electrical components. Incorporation of such surge protectors, however, add significantly to the complexity in manufacturing, and hence, the cost of an interconnect unit. In addition, if a voltage surge above what the protector is designed to handle is experienced by the connector unit, it will need to be replaced in any event.

It is therefore a desired object and advantage of the present invention to provide an over-voltage surge protection device that is inexpensive to manufacture relative to the state of the art.

It is a further object and advantage of the present invention to provide over-voltage surge protection device that can withstand multiple surges, hence increasing the life of the coaxial cable interconnect device.

It is yet a further object and advantage of the present invention to provide surge protection, while at the same time not increasing the overall size or complexity of the cable interconnect device.

SUMMARY OF THE INVENTION

In accordance with the foregoing objects and advantages, and others, the present invention provides an over-voltage surge protection device comprising a printed circuit board having a signal carrying conductive member having a plurality of nodes positioned therealong, and a conductive member running to ground positioned therealong. The nodes on the signal carrying member and the ground member extend along a common path with corresponding ones of the signal carrying nodes positioned in adjacent, but spaced relation to the conductive area of the ground member. In one version, the nodes of the signal carrying member are shaped in the form of triangles due to this particular geometry's favorable ability to accumulate and discharge voltage.

The over-voltage surge protection device may be entirely fabricated according to one version directly into the board without mounting any additional structure thereto. A circuit board substrate that contains a layer of conductive material coated thereon may be fabricated by removing conductive material (e.g., by laser ablation, chemical or photolithographic etching, or other conventional fabrication process) in all areas on the board other than those assumed by the signal carrying members and the conductive member leading to ground, respectively. The area of non-conductive material, i.e., air, separating the signal carrying members from the ground member, become the spark gaps.

According to an alternative construction, the ground conducting member can be formed along the interior of the housing of the device, which can be similarly ablated or etched with a conductive material, such as brass, the ground conducting member being aligned with the nodes of the signal conducting member and separated by non-conductive material e.g., air, providing spark gaps. In this particular design, surge protection can be provided while optimizing space consumption of the circuit board.

The spacing between the nodes (and their shape) determine the voltage level at which a spark will generate and shunt the circuit. The number of nodes present in the device will determine the number of over-voltage surges the device will be able to withstand.

In operation, and as the relative voltage potential between the node of the signal carrying member and the conductive area of the ground conducting member approaches a predetermined value, a spark will generate across the gap separating the node and the ground member. This spark discharges the voltage from the signal carrying member to the grounded member, thereby shunting the circuit. Any particular spark may cause a deterioration of the particular node, which discharges the surge. However, due to the device having a plurality of corresponding sets of nodes, the device, including the circuit board, will be able to withstand at least an equal number of over-voltage surges.

BRIEF DESCRIPTION OF THE DRAWINGS

For a further understanding of these and objects of the invention, reference will be made to the following detailed description of the invention which is to be read in connection with the accompanying drawing, where.

DETAILED DESCRIPTION OF THE INVENTION

Figure 1:
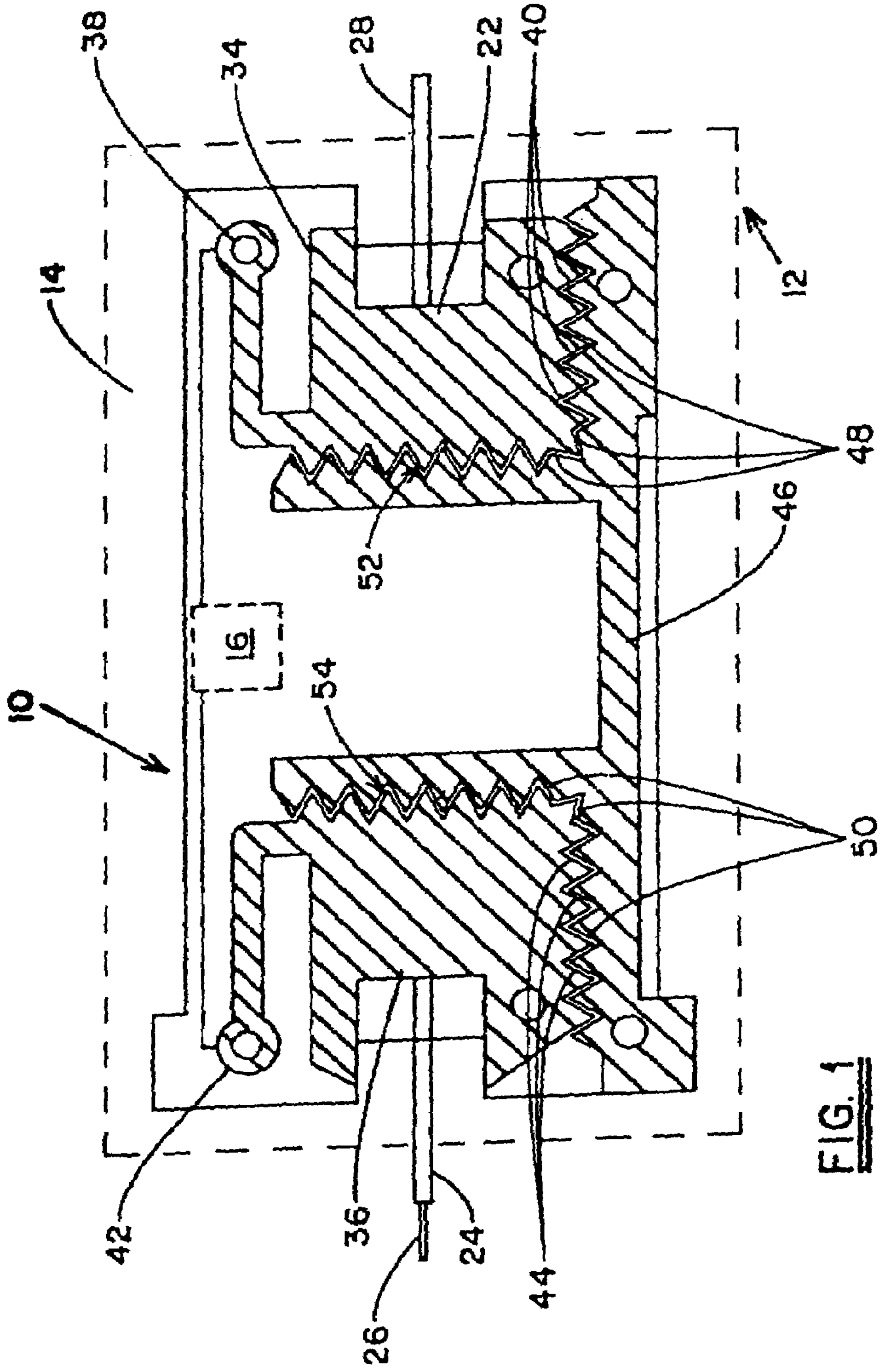
FIG. 1 is a plan view of a preferred embodiment of the present invention.

Referring now to the drawings, wherein like reference numerals refer to like parts throughout, there is seen in FIG. 1 a printed circuit board, designated generally by reference numeral 10, for use in a coaxial cable interconnect device, shown generally by reference numeral 12. Circuit board 10 is composed of a non-conductive substrate (e.g., a ceramic substrate of fiberglass) having a pair of parallel planar surfaces wherein a layer of conductive material, such as copper, that is coated on at least one planar surface 14 thereof. A series of electrical components, shown generally be reference numeral 16, are mounted in a conventional manner to either planar surface of board 10.

Interconnect device 12 serves, for instance, as a trap with electrical components 16 comprising a filter having a narrow pass band response within a predetermined frequency range (e.g., 5-40 MHz) with a fixed level of attenuation across the return path frequency spectrum. Such devices are commonly used in CATV networks.

Figure 3:
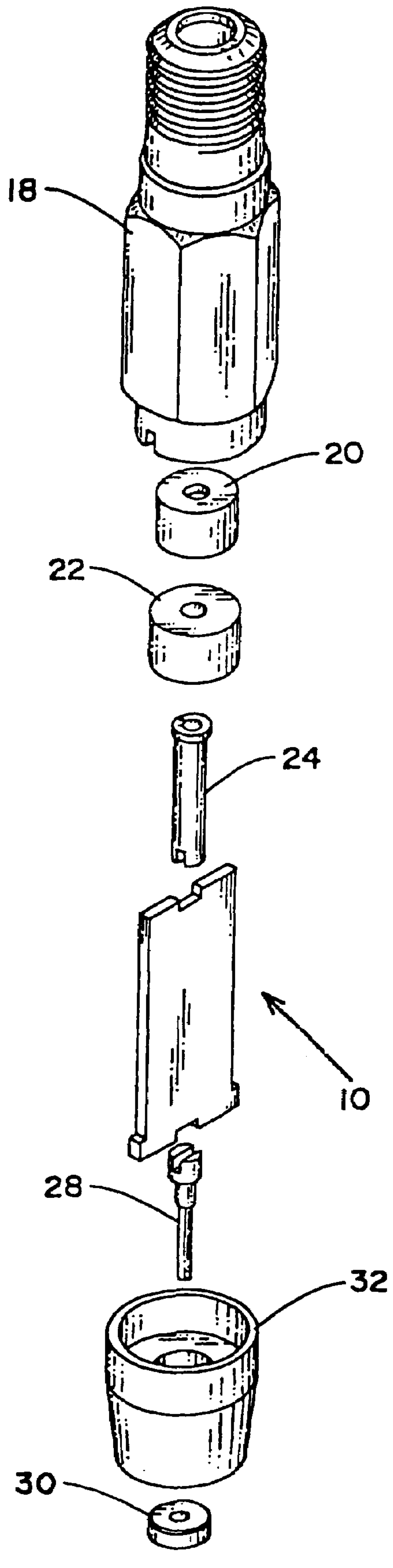
FIG. 3 is an exploded perspective of an interconnect device in which the present invention is used.
Figure 4:
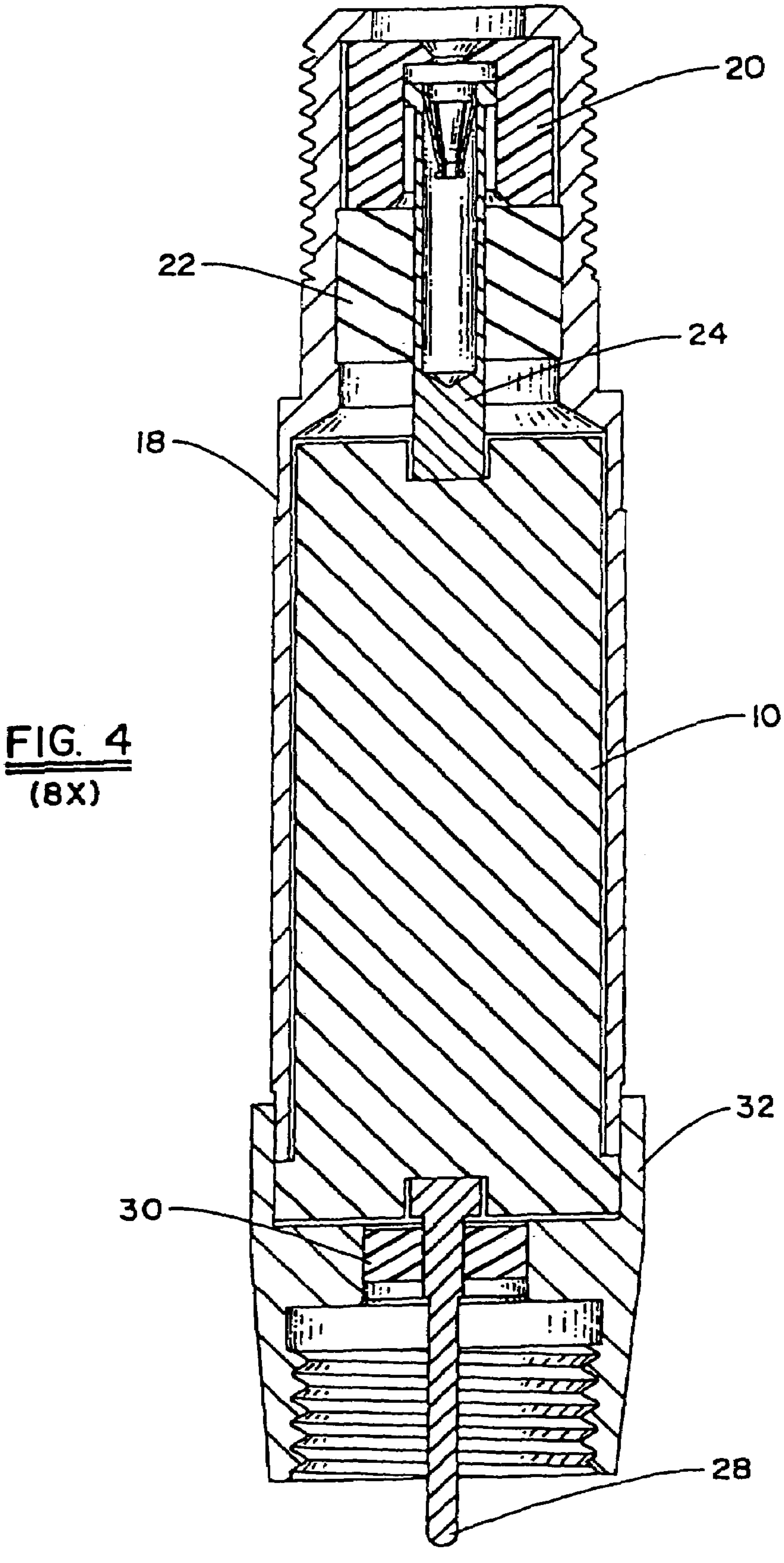
FIG. 4 is a longitudinal cross-sectional view of the interconnect device illustrated in FIG. 3.

Referring specifically to FIGS. 3 and 4, interconnect device 12 includes an elongated main body 18; a rear insulator 20 mounted concentrically within body 18 and positioned adjacent the terminal end thereof; a non-conductive (e.g., rubber) seal 22 positioned adjacent insulator 20; a conductive female pin assembly 24 (which receives a conductive output pin 26 therein) concentrically extending though insulator 20 and seal 22; the circuit board 10 being electrically connected a one edge to the female pin assembly 24; a conductive input pin 28 electrically connected to and extending outwardly from the opposing edge of circuit board 10; a front insulator 30 positioned concentrically around the input pin 28; and a nut 32 threadingly engaging the main body 18 and housing the front insulator 30. In operation, conductive input pin 28 receives a signal being transmitted through a coaxial cable (as part of a communications network), and the conductive output pin 26 sends the signal towards its destination after having been conditioned by electrical components 16 mounted on either planar surface of the circuit board 10.

Figure 2:
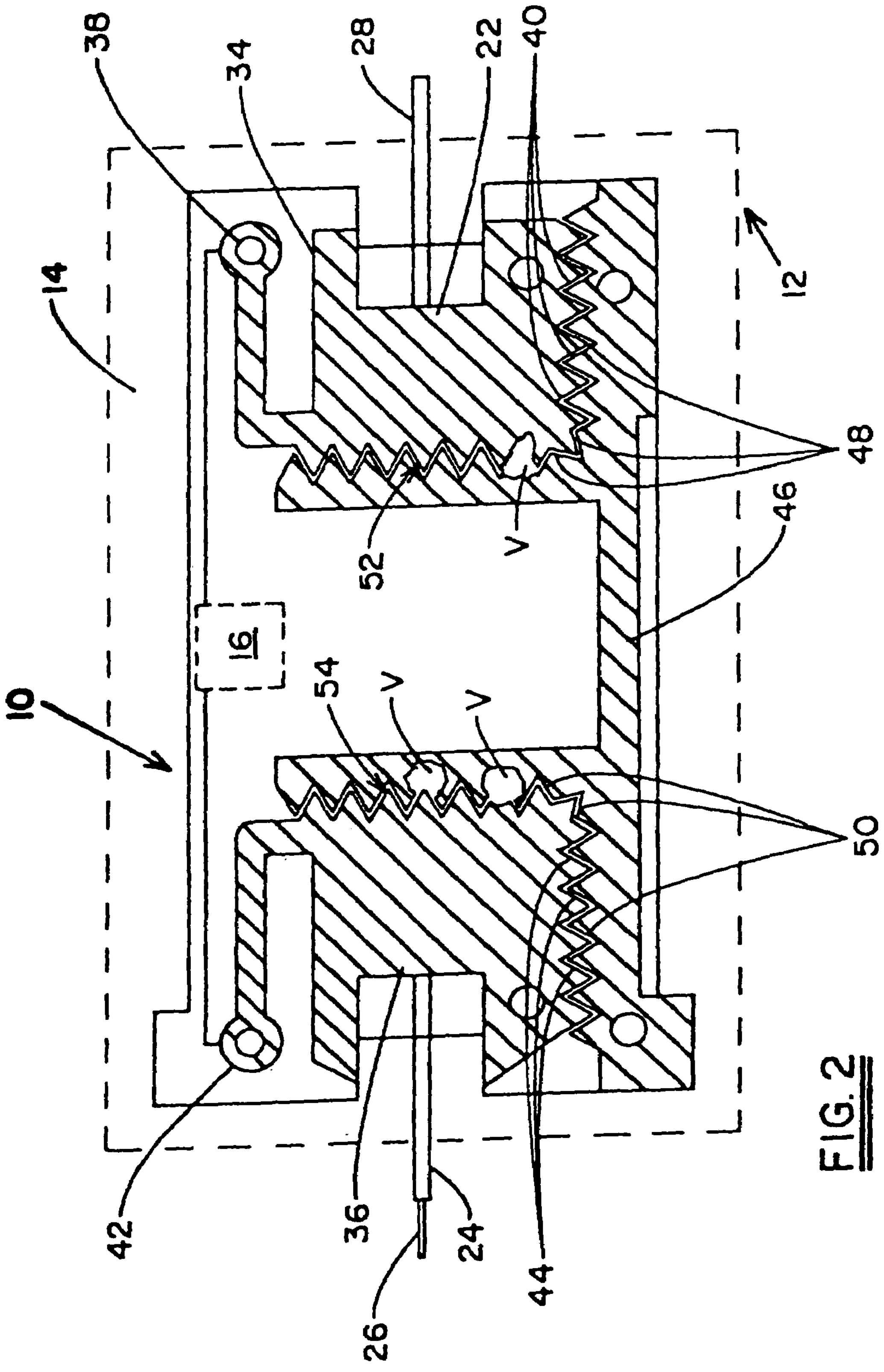
FIG. 2 is a plan view of the present invention after it has been exposed to over-voltage surge.
Figure 5:
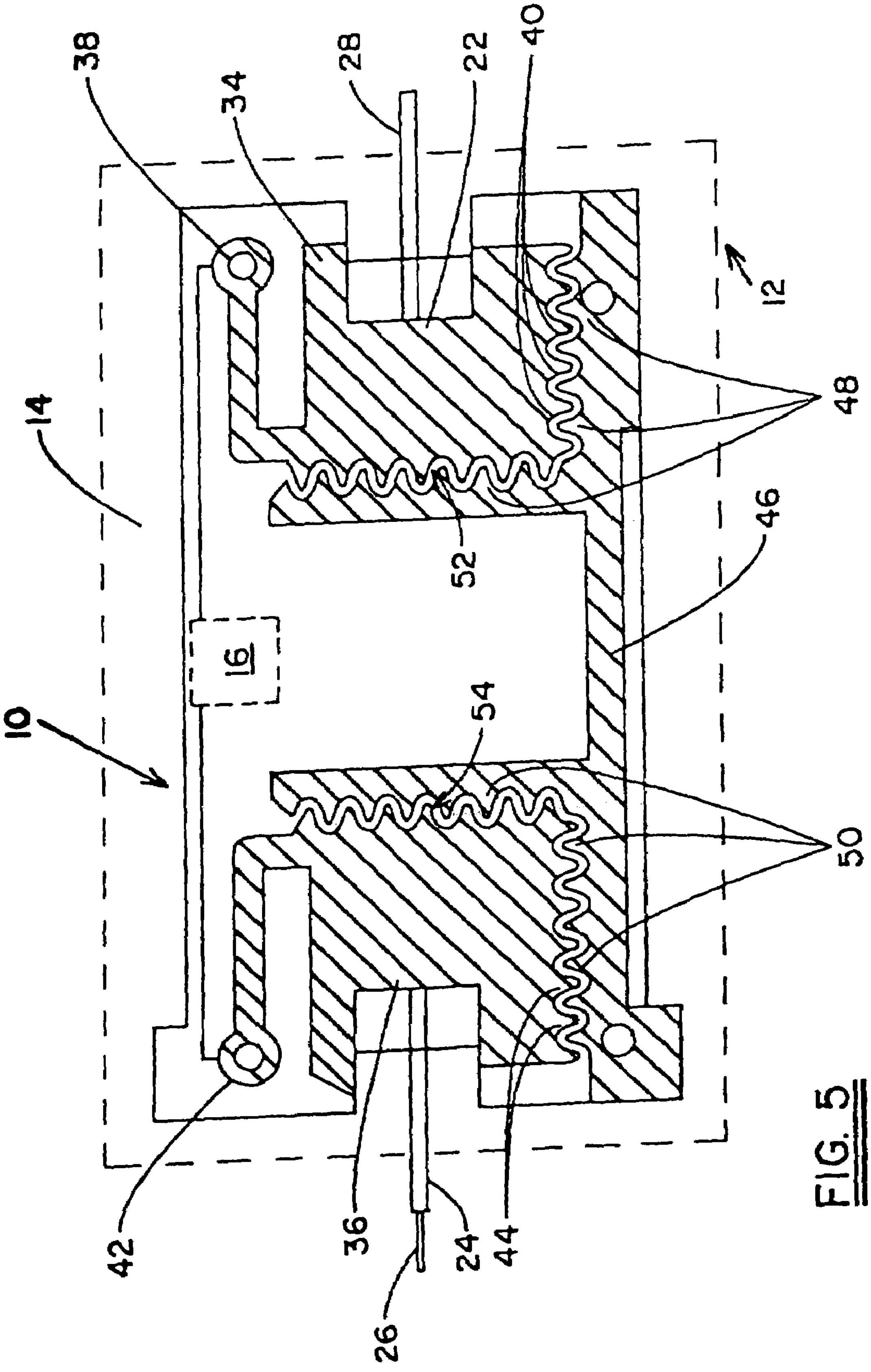
FIG. 5 is a plan view of a second alternate embodiment of the present invention.

Referring specifically to FIGS. 1, 2 and 5, the printed circuit board 10 includes the afore mentioned electrical components 16 mounted on at least one planar surface 14, a signal carrying, input member 34 electrically connected to the input pin 28, and a signal carrying, output member 36 electrically connected to female pin assembly 24. Signal carrying members 34 and 36 are preferably mounted on the other side thereof (although these elements could be mounted on the same side as electrical components 16, it is more space efficient to mount them on opposing sides and electrically interconnect there with vias). Signal carrying input member 34 comprises electrically conductive material extending from the input pin 28 to a terminal node 38, and includes a plurality of nodes 40 positioned between the input pin 28 and terminal node 38. Output member 36 comprises an electrically conductive material extending from a terminal node 42 to the female pin assembly 24, and a plurality of nodes 44 positioned between node 42 and pin assembly 24. Nodes 40 and 44 are preferably triangular in shape (FIGS. 1 and 2), but may be shaped in other geometries, as well, as noted herein.

Terminal node 38 is electrically connected to electrical components 16 which are, in turn, electrically connected to the output terminal node 42. Thus, when the low voltage signal (e.g., device 12 generally operates on a circuit that passes 100 volts AC, with an RF level typically between +10 and −10 dBm) is received through the input pin 28, the signal is transmitted through the signal carrying input member 34 to the electrical components 16 on the circuit board 10. Electrical components 16 then appropriately condition (e.g., filter) the signal and sent it through the signal carrying output member 36. The signal is then sent towards its final destination via the output pin 26.

According to this embodiment, an electrically conductive ground member 46 is also mounted on the printed circuit board 10. The conductive ground member 46 includes a first plurality of nodes 48 which correspond in shape and number to the nodes 40, and a second plurality of nodes 50 which correspond in shape and number to nodes 44. Nodes 48 are positioned in adjacent, but spaced relation to corresponding ones of nodes 40, thereby forming a first plurality of arc or spark gaps 52 (each arc or spark gap 52 being defined by corresponding ones of nodes 40 and 48). Nodes 50 are positioned in adjacent, but spaced relation to corresponding ones of nodes 44, thereby forming a second plurality of arc or spark gaps 54 (each arc gap 54 defined by corresponding ones of nodes 44 and 50). Nodes 48, 40, 50, and 44 are defined by (and the sparks accumulate at and are discharged from) the peripheral edges of the respective conductive members of they form a part.

The arc gaps 52 and 54 separating nodes 48 from nodes 40, and nodes 50 from nodes 44, respectively, are composed of non-conductive material (such as a gap of air) and are of generally uniform thickness. If a transient surge of high voltage (e.g., as a consequence of a lightning strike) is received by either the input pin 28 or the output pin 26, the voltage will travel to nodes 40 and 44, respectively, at which point a spark will generate and arc across arc gaps 52 and 54, respectively. The high voltage surge will then be grounded by the conductive ground member 46, thereby shunting the circuit and protecting the mounted electrical components 16 therefrom. If the high voltage surge is not shunted, electrical components 16 would be destroyed through the heat generated by the surge. Consequently, it is essential to the long-term reliability of the interconnect device 12 that the device contain the over-voltage surge protection capabilities embodied by spark gaps 52 and 54.

Spark gaps 52 and 54 according to this embodiment are preferably between 1 and 10 mils in thickness. Obviously, the smaller the spark gap distance, the lower the voltage level that will generate a spark.

If a transient high voltage surge does come through pins 28 or 26 and a spark does generate across nodes 40 to 48 or 44 to 50, it is possible that a portion of the nodes 48, 50 will deteriorate and vaporize, as illustrated in FIG. 2 by reference letters V. However, even if portions of nodes 48, 50 do deteriorate, the remainder of the plurality of nodes 48, 50 remain intact. Accordingly, spark gaps 52 and 54 provide an over-voltage surge protection device that can withstand numerous over-voltage surges.

Figure 6:
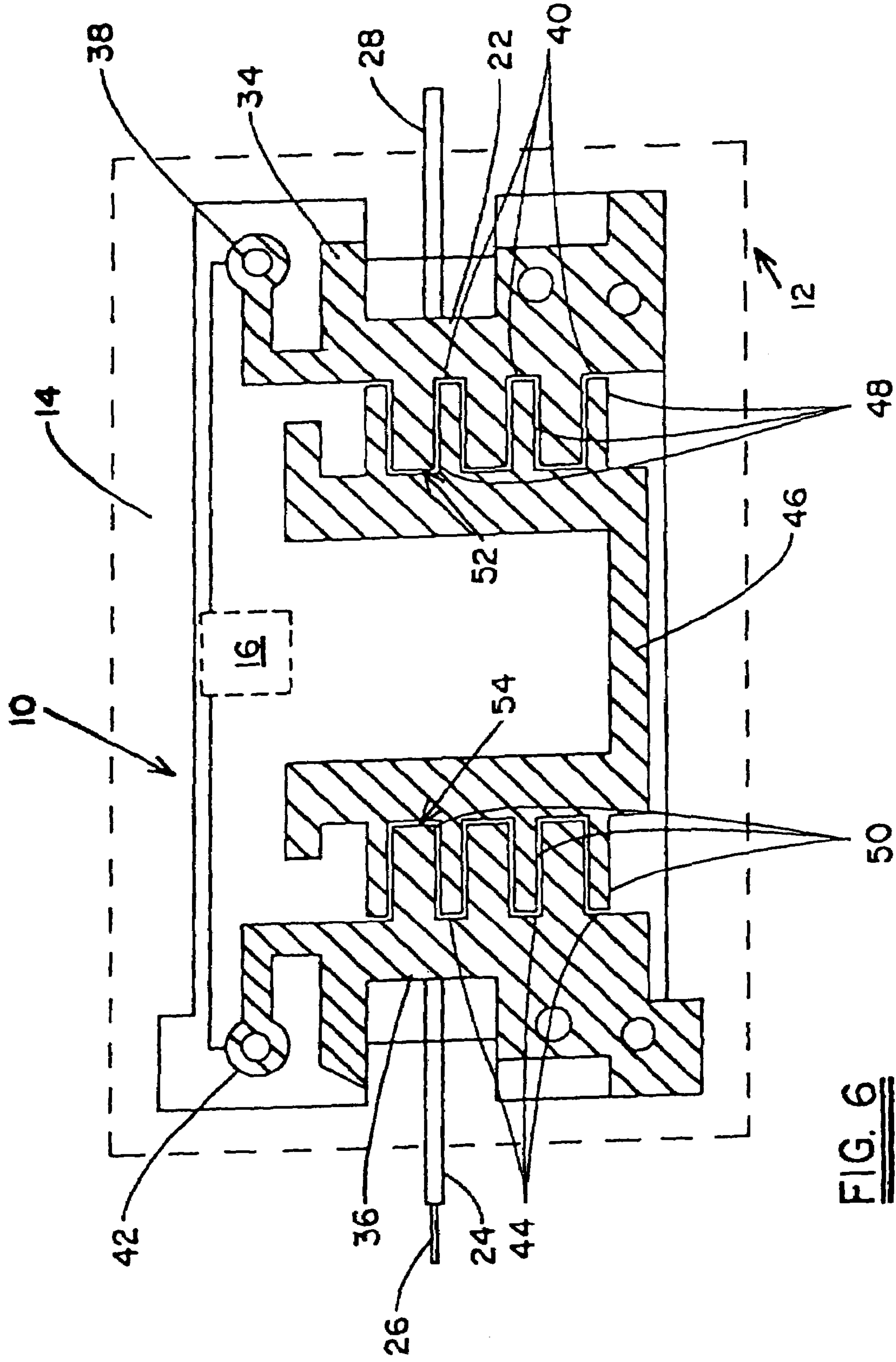
FIG. 6 is a plan view of a third alternate embodiment of the present invention.
Figure 7:
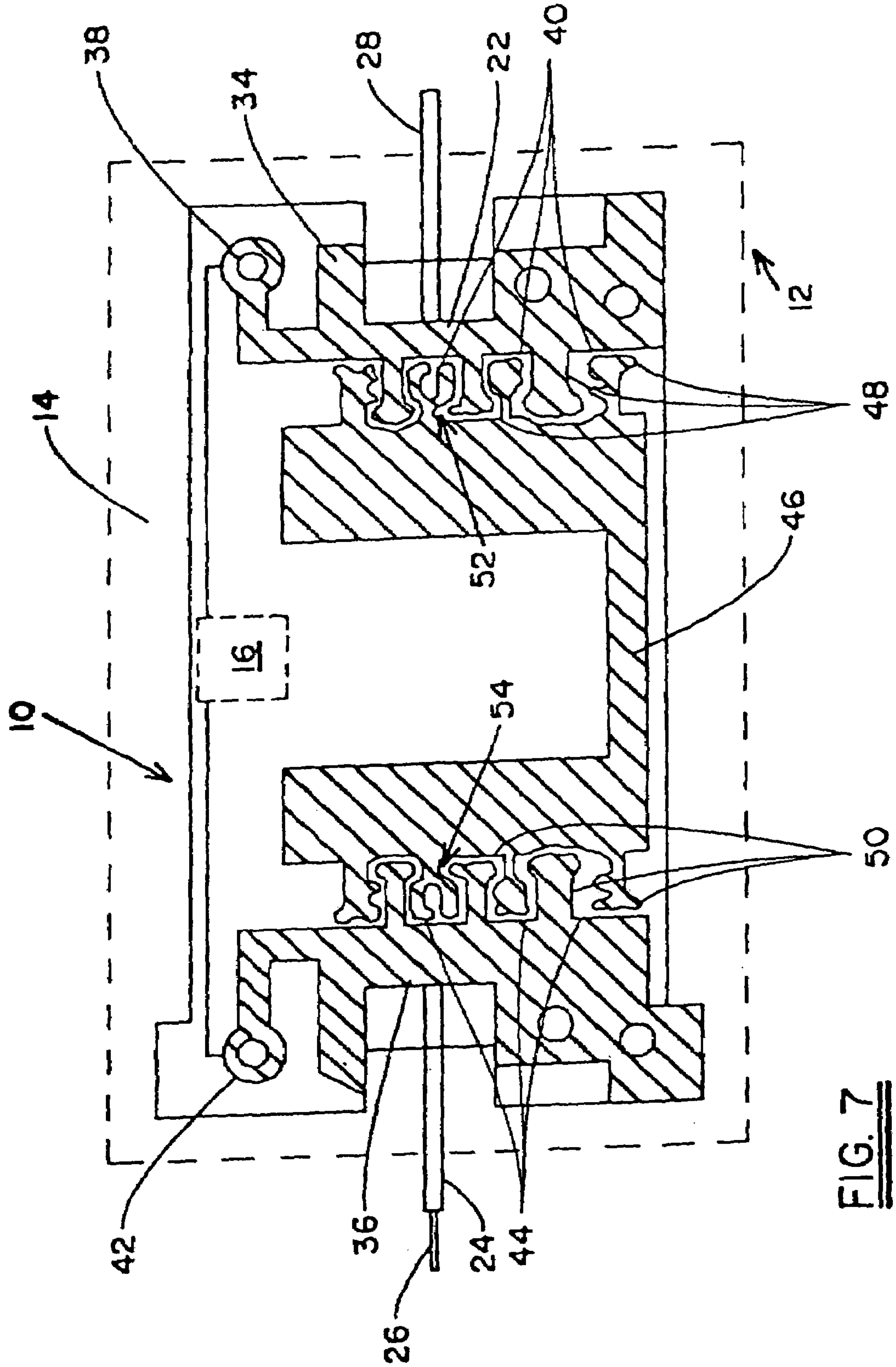
FIG. 7 is a plan view of a fourth alternate embodiment of the present invention.
Figure 8:
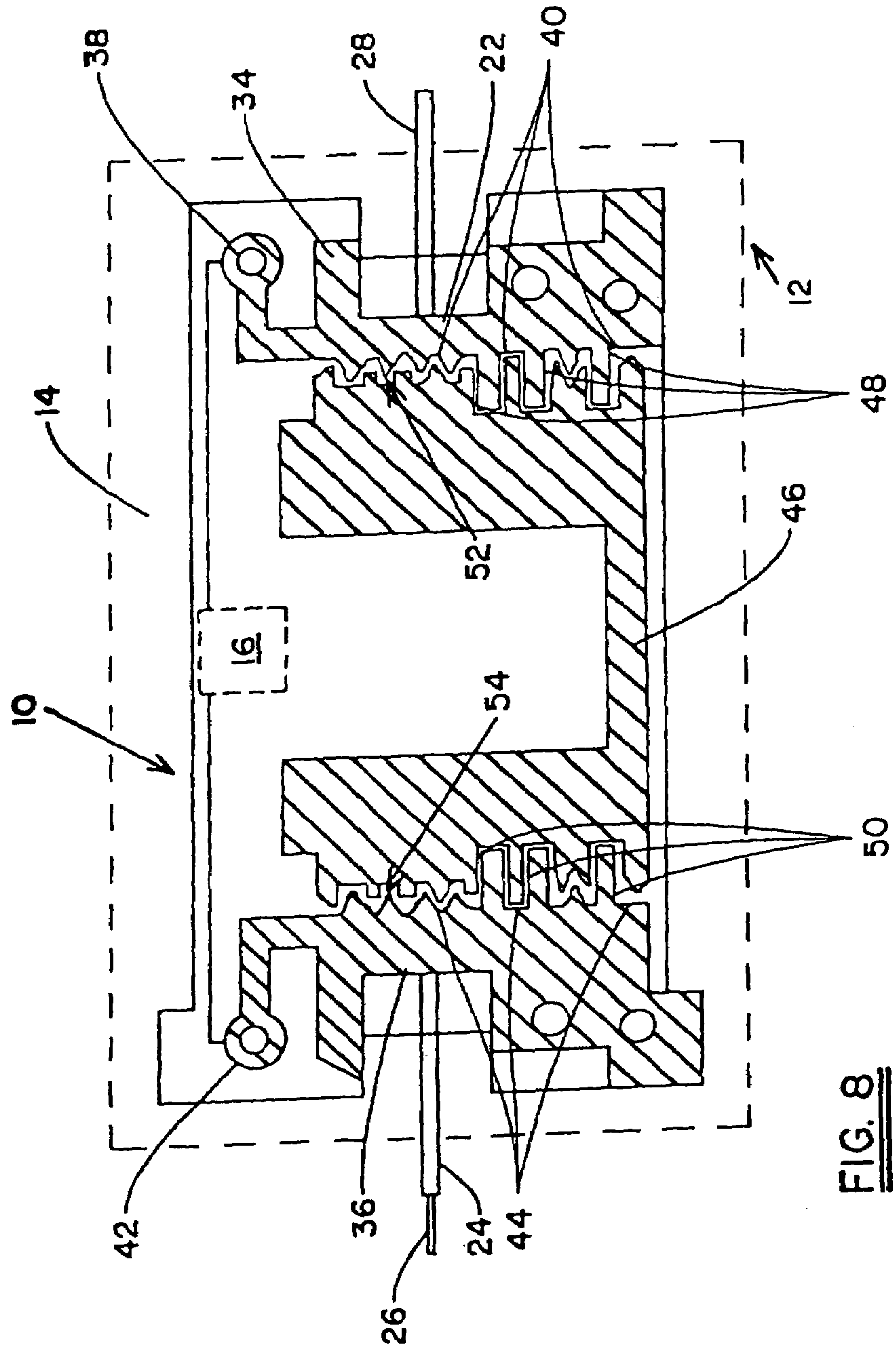
FIG. 8 is a plan view of a fifth alternate embodiment of the present invention.
Figure 9:
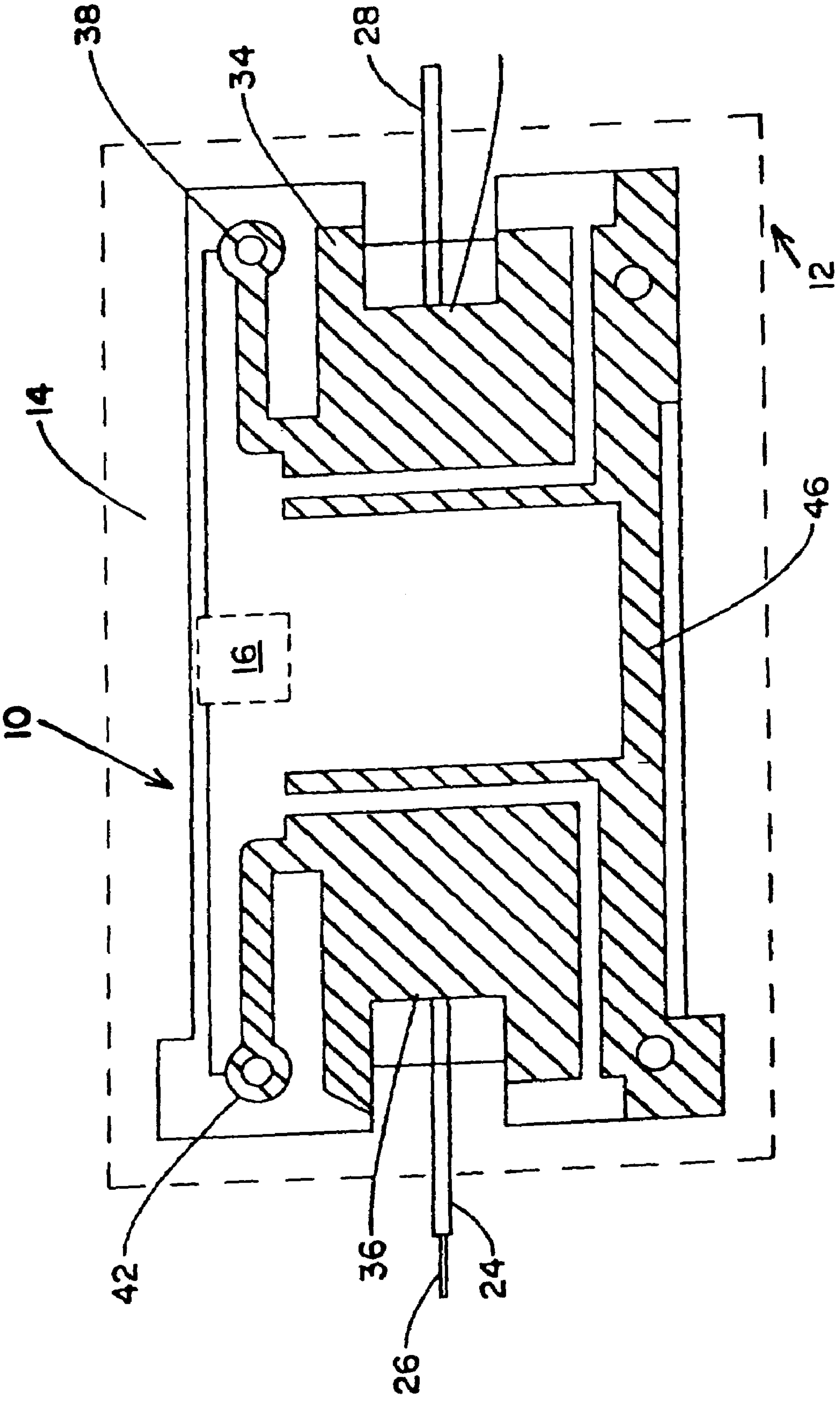
FIG. 9 is a plan view of a sixth alternate embodiment of the present invention.
Figure 10:
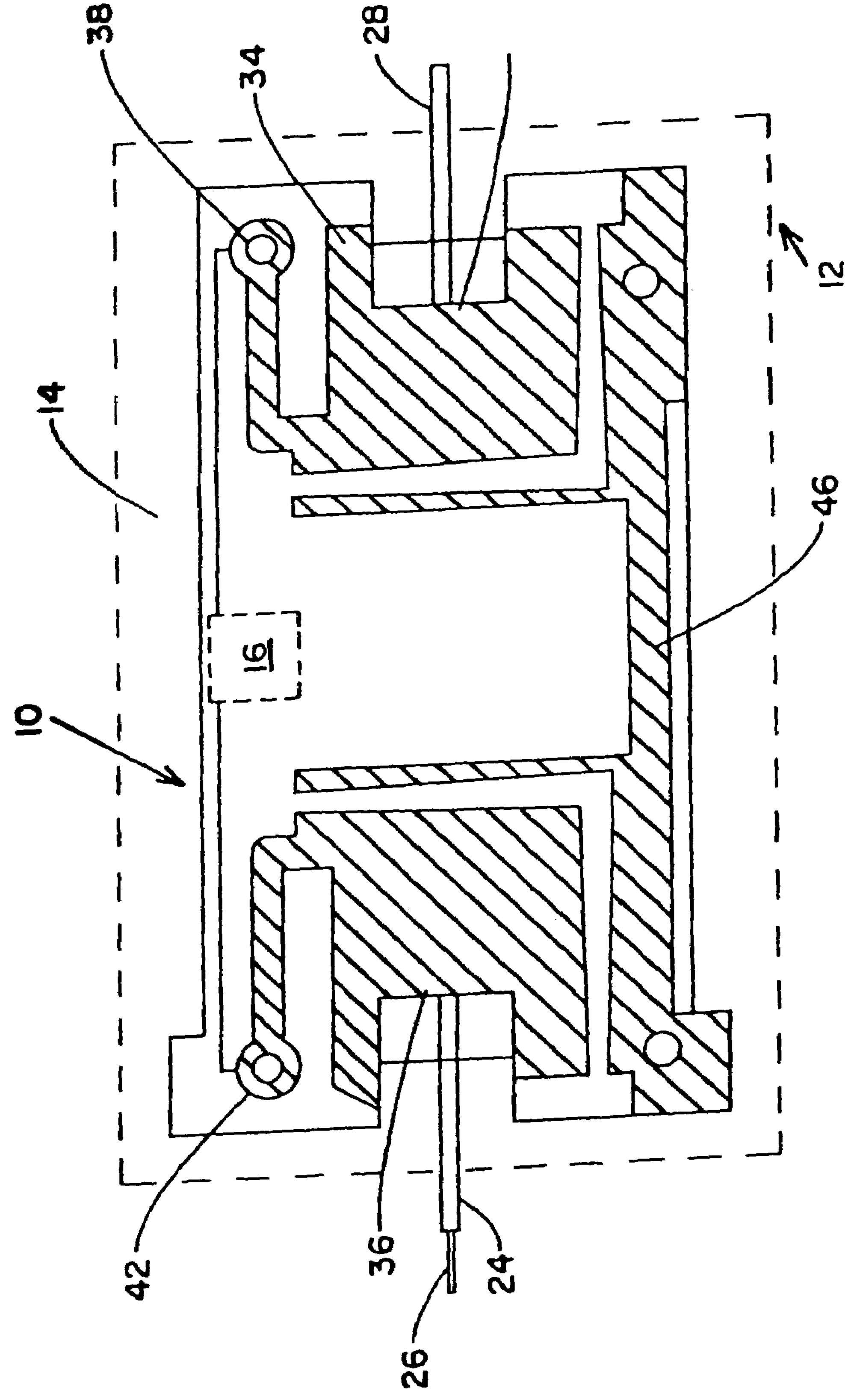
FIG. 10 is a plan view of a seventh alternate embodiment of the present invention.

Nodes 40, 48, 44 and 50 are preferably triangular in shape (as illustrated in FIGS. 1 and 2), thereby forming a zigzag arc gap pattern, as this geometry appears to most effectively accumulate and discharge voltages. It should be clear that "nodes" is referring to the peripheral edge geometry of the conductive regions, as it is defined in the drawings and this accompanying specification. It should also be noted that these nodes could be shaped in other patterns so long as the spacing between corresponding nodes is small enough to maintain the efficiency of spark gaps 52, 54 (e.g., the spacing can be variable, but preferably within the range of 1 to 10 mils.). For instance, corresponding nodes could be shaped sinusoidally (see FIG. 5), rectangularly shaped (see FIG. 6), arbitrarily shaped (see FIG. 7), rectangularly shaped with triangularly shaped corresponding nodes (see FIG. 8), linear and substantially uniformly spaced apart (see FIG. 9), or linear with the spacing being varied along their lengths (see FIG. 10).

In forming spark gaps 52, 54, the printed circuit board 10 is provided with a coating of conductive material on one of its planar surfaces as previously noted. Conductive material is then removed through any conventional process (e.g., laser ablation, photolithographic or chemical etching, or the like) from the areas of the circuit board 10 that are to be non-conductive, i.e., all areas other than input member 34, output member 36, and ground member 46. Forming spark gaps 52, 54 in this manner causes the gaps to be co-planar with the printed circuit board 10, thereby using minimal space and not requiring the mounting of any additional structure to board 10.

Figure 11:
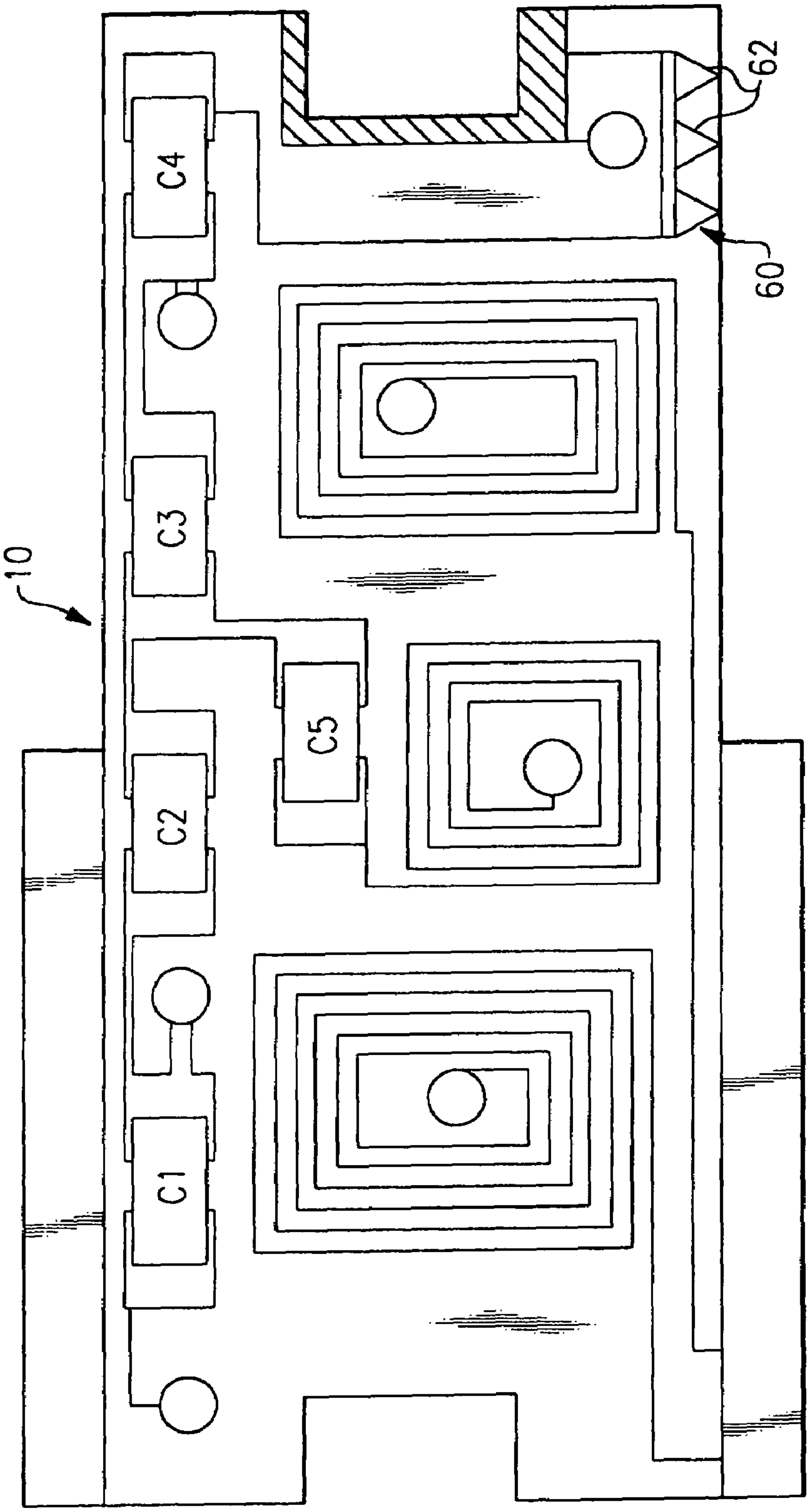
FIG. 11 is a plan view of an eighth alternate embodiment of the present invention.
Figure 12:
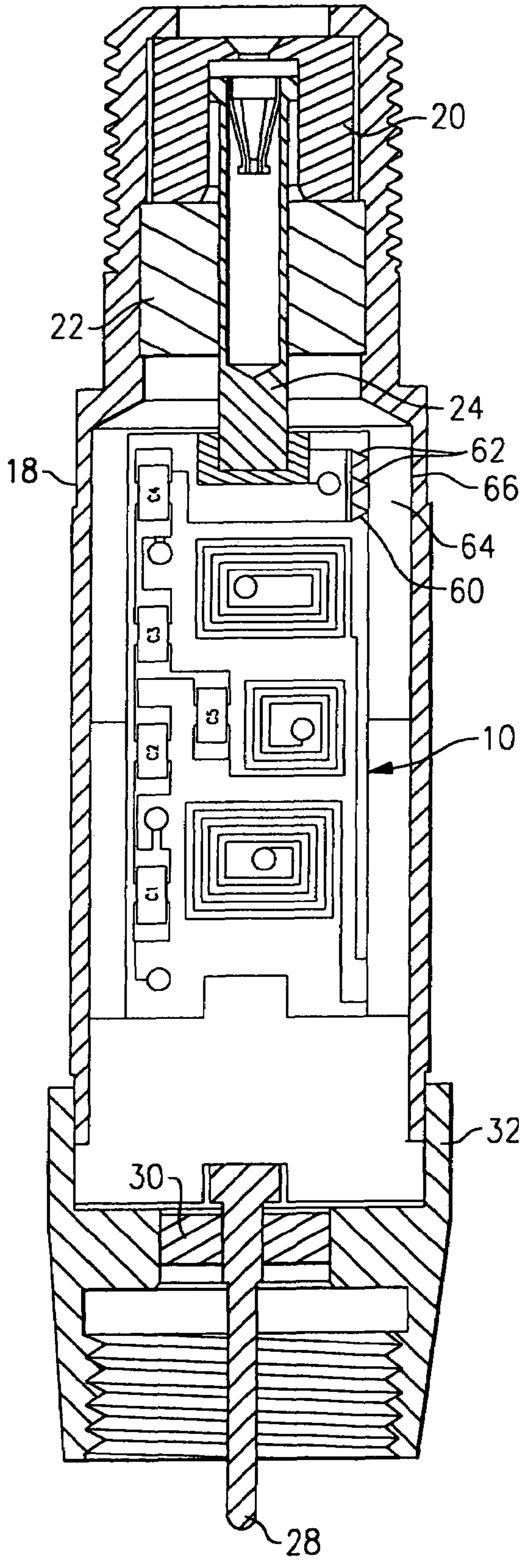
FIG. 12 is a partial perspective view of the device according to the eighth alternate embodiment of the present invention.

It should be readily apparent that the spark gaps that have been described herein need not be directly etched solely onto the printed circuit board 10. Referring to FIGS. 11 and 12, an alternative embodiment is herein described in which the ground conducting member is formed in the main body 18 of the interconnect member 12 wherein a defined gap (e.g., an air spacing) is defined between a first conductive area 60, etched in the same manner as described above in a planar surface of the printed circuit board 10 wherein a plurality of nodes 62 are formed, and a second conductive area 66, that is formed (e.g., etched, ablated, etc) in like manner on the interior of the main body 18, the main body already being made from a conducting material, such as brass, such that the formation of nodes are not necessary. Advantageously, the preceding embodiment permits the same cost-savings in terms of surge protection for the interconnect device while at the same time permitting the printed circuit board 10 to have adequate space for electrical componentry. As in the preceding, the spark gaps 64 formed between the first and second conductive area 60, 66 should be spaced between about 1 mil and 10 mils and as in the preceding the nodes though shown herein according to this embodiment with triangular shape, can assume other suitable geometries with varied or constant spacing between the nodes 62, as needed or selected.

While the present invention has been particularly shown and described with reference to the preferred mode as illustrated in the drawings, it will be understood by one skilled in the art that various changes in detail may be effected therein without departing from the spirit and scope of the invention as defined by the following claims.

I claim:

1. A coaxial interconnect device, said interconnect device comprising:

a main body;

a printed circuit board having at least one surface on which an electrical circuit is mounted;

a first signal carrying area of conductive material on a surface of said printed circuit board including a plurality of nodes; and a second grounded conductive area of conductive material on the interior of said main body adjacently positioned in corresponding spaced relation to said plurality of nodes so as to define a first plurality of spark gaps in the spaces between said plurality of nodes and said second conductive area wherein said spark gaps are each made from a non-conductive material.

2. A coaxial interconnect device as claimed in claim 1, wherein said plurality of nodes are triangular in shape.

3. A coaxial interconnect device as claimed in claim 1, wherein said plurality of nodes are sinusoidal in shape.

4. A coaxial interconnect device as claimed in claim 1, wherein said plurality of nodes of said first conductive area and said second conductive area are spaced between about 1 and 10 mils.

5. A coaxial interconnect device as claimed in claim 1, wherein the spacing between the plurality of nodes and said second conductive area is linearly variable therebetween.

6. A coaxial interconnect device as claimed in claim 1, wherein the spacing between the plurality of nodes and said second conductive area is essentially constant therebetween.

7. An electrical surge protection device, said device comprising:

a main body;

a circuit board having a surface on which an electrical circuit is mounted;

a first signal carrying area of conductive material formed on a surface of said circuit board; and a second grounded area of conductive material formed on the interior of said main body, said first area of conductive material including a plurality of nodes, each of said plurality of nodes being in spaced relation and being separated from said second conductive area so as to define a plurality of spark gaps therebetween.

8. An electrical surge protection device as claimed in claim 7, wherein said plurality of nodes are triangular in shape.

9. An electrical surge protection device as claimed in claim 7, wherein said plurality of nodes are sinusoidal in shape.

10. An electrical surge protection device as claimed in claim 7, wherein said plurality of nodes and said second conductive area are spaced between about 1 and 10 mils.

11. A method for providing electrical surge protection in a coaxial interconnect device, said interconnect device including a main body and a printed circuit board disposed within said main body having at least one surface on which an electrical circuit is mounted, said method including the steps of:

forming a first signal carrying area of conductive material on a surface of said printed circuit board including a plurality of nodes; and forming a second grounded area of conductive material on the interior of said main body wherein said plurality of nodes and said second grounded area of conductive material are separated by a spark gap, said spark gap being formed from a non-conducting material.

12. A method as claimed in claim 11, wherein said non-conducting material is air.

13. A method as recited in claim 11, wherein said plurality of nodes are each triangular in shape.

14. A method as recited in claim 11, wherein said plurality of nodes are each sinusoidal in shape.

15. A method as claimed in claim 11, wherein said spark gaps are defined by a spacing of between about 1 and 10 mils.

* * * * *